US006319435B1

(12) United States Patent
Hinzpeter et al.

(10) Patent No.: US 6,319,435 B1
(45) Date of Patent: Nov. 20, 2001

(54) METHOD FOR PRODUCTION MONITORING WITH THE MANUFACTURE OF TABLETS IN A ROTARY TABLETTING MACHINE

(75) Inventors: Jürgen Hinzpeter; Ingo Schmidt, both of Schwarzenbek; Ulrich Gathmann; Jörg Reitberger, both of Hamburg; Joachim Greve, Pogeez; Klaus-Peter Preuss, Mölin, all of (DE)

(73) Assignee: Wilhelm Fette GmbH, Schwarzenbek (DE)

( * ) Notice: Subject to any disclaimer, the term of this patent is extended or adjusted under 35 U.S.C. 154(b) by 0 days.

(21) Appl. No.: 09/406,585

(22) Filed: Sep. 27, 1999

(30) Foreign Application Priority Data

Sep. 28, 1998 (DE) .............................................. 198 44 390

(51) Int. Cl.[7] ..................................................... B29C 43/08
(52) U.S. Cl. ......................... 264/40.1; 264/40.5; 425/149
(58) Field of Search ................................. 264/40.1, 40.5; 425/149

(56) References Cited

U.S. PATENT DOCUMENTS 5,004,576 * 4/1991 Hinzpeter et al. .................. 264/40.5
5,145,693 * 9/1992 Hinzpeter et al. .................. 425/149

FOREIGN PATENT DOCUMENTS 0 30 563 2/1989 (EP) .
0 431 269 9/1990 (EP) .

* cited by examiner

*Primary Examiner*—Mary Lynn Theisen
(74) *Attorney, Agent, or Firm*—Vidas, Arrett & Steinkraus, P.A.

(57) ABSTRACT

A method for the production monitoring with the manufacture of tablets in a rotary tabletting machine, with a row of upper and lower punches arranged in pairs, which cooperate with matrix bores, in which for each punch pair the maximum of the pressing force is measured, via a preselected number of readings (measuring row) an actual mean value is computed and compared to a nominal mean value and the supply of material to the individual matrix bores (filling degree) is changed when the deviation exceeds a predetermined measure, wherein before forming the mean value those pressing force readings of each measuring row, which significantly deviate with respect to other readings, are eliminated (freak value test).

5 Claims, 1 Drawing Sheet

METHOD FOR PRODUCTION MONITORING WITH THE MANUFACTURE OF TABLETS IN A ROTARY TABLETTING MACHINE

BACKGROUND OF THE INVENTION

The invention relates to a method for production monitoring with the manufacture of tablets in a rotary tabletting machine.

From EP 0 431 2689 it is known with the manufacture of tablets to continuously measure the applied pressing forces and to compare these with nominal values. If a measured maximum pressing force value lies outside nominal value limits the tablet concerned is sorted out. Each punch pair of the rotary press has an order number so that with a deviation from the nominal value it is certain which punch pair or matrix bore is concerned. With the help of such a method the quality of the tablets may be continuously monitored.

From the mentioned document it is also known by way of the application of an angular impulse outputter to evaluate the respective position of the matrix disk and to coordinate this with the maximum pressing force values. By way of this a monitoring may also be continued with an exchange of a matrix disk without an adjustment of the electronic means being required.

From EP 0 350 563 it is also known, from the measuring results for the maximum pressing forces, to form a mean value and to compare this with tolerance limits. The course of the pressing force values gives conclusions as to the degree of filling of the matrix bores. If the mean value exceeds the tolerance limits a readjustment of the filling of the matrix bores is carried out. In this way a control may be effected relatively quickly. For evaluation of the mean values a few rotations of the press rotor are sufficient, by which means a useable mean value is available within a few seconds. The control of the filling may therefore likewise be effected in the shortest of times. Errors which occur on account of an unexact degree of filling may therefore be alleviated relatively quickly.

From EP 0 350 563 it is also known to set tolerance limits for the pressing forces of each individual punch pair. If the tolerance limits are exceeded this is a sign for an inadequate functioning of this punch pair, for example on account of a fracture, the adhesion of material, of the bursting away of the pressing surface on the punch head and likewise.

For maintaining quality, it is finally known from time to time, for example in an interval of quarter of an hour, to take samples. A row of tablets, for example 20, are removed from the production. From the weight of the tablets a mean value is formed which is compared to a nominal mean value. If the measured mean value deviates from predetermined tolerance limits, the supply of material to be pressed is readjusted.

With the evaluation of mean values for the pressing force adulterations may occur which displace the mean value by a measure which does not correspond to actual ratios. Thus on account of an error in the data transmission an erroneous reading may be transmitted to the computer. This error may occur temporarily or permanently. Furthermore by way of damage to a punch pair or the adhesing of material or by way of irregular supply of material a pressing force value may arise which deviates significantly from the remaining pressing force values of a measuring row. The described errors or disturbances lead to a mean value and thus to a readjustment for the material filling which are not justified by the other pressing force values. As a result such a filling degree control causes undesired fluctuations in the tablet weight.

BRIEF SUMMARY OF THE INVENTION

It is therefore the object of the invention to specify a method for the production monitoring with the manufacture of pressed parts in rotary tabletting machines in which fluctuations of the tablet weight may be kept within extremely tight limits.

BRIEF DESCRIPTION OF THE FIGURES

The present invention will now be described with reference to the accompanying drawing of a preferred embodiment, in which.

DETAILED DESCRIPTION OF THE INVENTION

Figure 1:
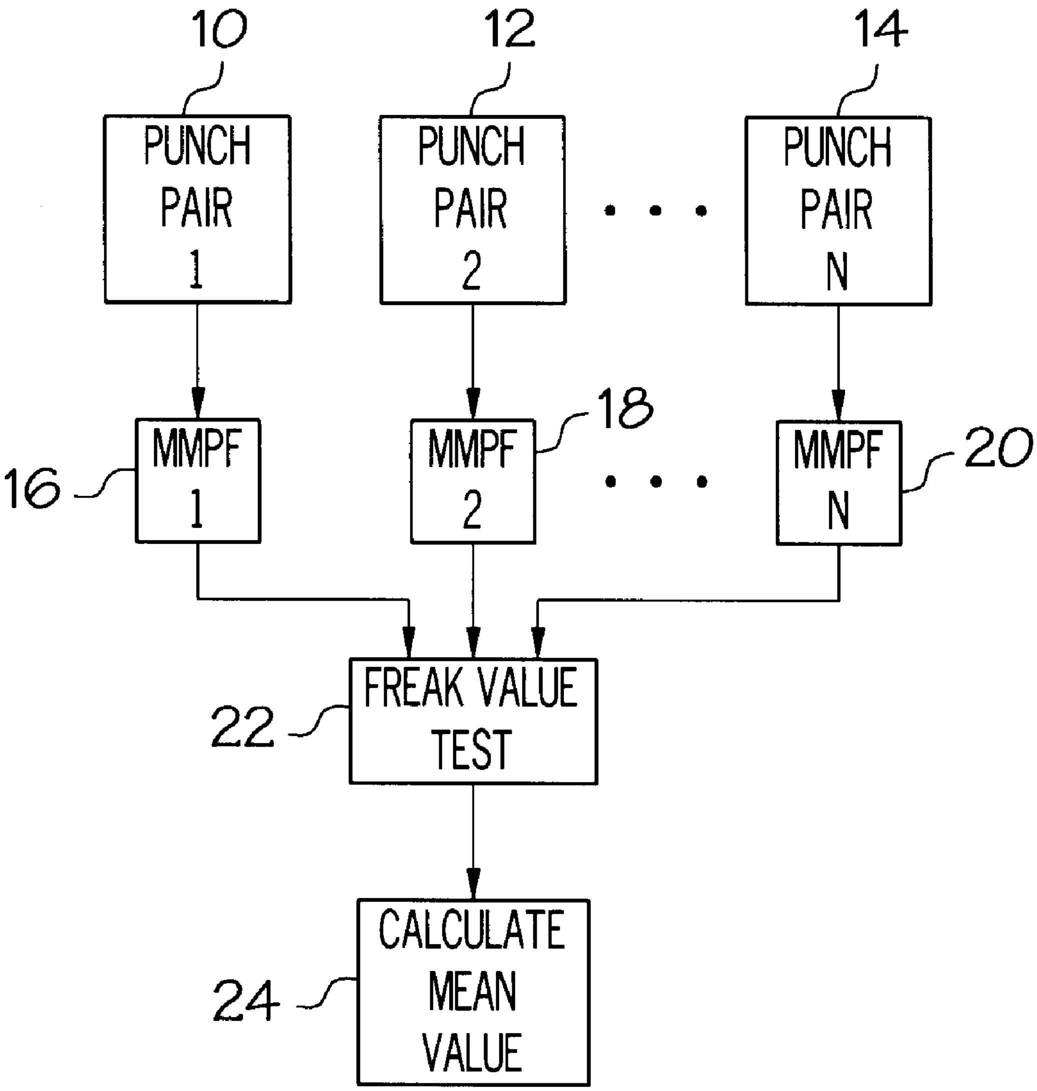
FIG. 1 is a block diagram.

With the method according to the invention before the mean value formation the examination with each measuring row of readings which deviate significantly from the remaining and their elimination takes place. In other words a freak value test is carried out with which significantly deviating values of a measuring row are eliminated and thus do not enter the computations of the mean value and the computation of the standard deviation.

Freak values for the pressing force measurements may for example arise by way of double pressings, signal disturbances in the measuring chain, damage to pressing surfaces, undesired coatings on the punch, etc.

With the help of the method according to the invention as a result the control of a tabletting machine for the weight of the pressed part to a value which is as exact as possible can be achieved. Fluctuations in the tablet weight are therefore minimal.

According to one formation of the invention the order number of the punch pair whose readings led to an elimination are stored. It may be the case that freak values are caused by continuous defects, for example a fracture of the punch, a too large or small punch length, etc. With the invention it is recognized with which punch pair the error occurs, so that it may be subsequently alleviated.

The statistical method which may be applied with the invention and is also known as the Shapiro-Wilks test or as the Nalimov test is known per se. According to this a table is set up which allocates a value which must be at least achieved so that 95% of all readings lie in the middle region, to the readings per measuring row, for example the complete number of punch pairs per rotary press.

For monitoring the control of a rotary tabletting machine usually a computer is used. With the computer types used for this it is possible without further ado to compute respective mean values within 1 to 2 seconds in order where required to be able to carry out a readjustment of the filling. The elimination of freak values requires an additional considerable computer expense, which however nevertheless without further ado may be completed within a minimal of computing time.

Referring now to FIG. 1, punch pairs 1 through N are shown in block form at 10, 12 and 14. The maximum measured pressing force of each punch pair is determined at blocks 16, 18 and 20. At block 22 the measured values are compared and freak values are eliminated, as discussed above. At block 24 the actual mean value is computed for use as discussed above.

What is claimed is:

1. A method for the production monitoring with the manufacture of tablets in a rotary tabletting machine, with a row of upper and lower punches arranged in pairs, which cooperate with matrix bores, in which for each punch pair the maximum of the pressing force is measured, via a preselected number of readings (measuring row) an actual mean value is computed and compared to a nominal mean value and the supply of material to the individual matrix bores (filling degree) is changed when the deviation exceeds a predetermined measure, wherein before forming the mean value those pressing force readings of each measuring row, which significantly deviate with respect to other readings, are eliminated (freak value test).

2. A method according to claim 1, wherein the order number of the punch pair whose reading is eliminated is stored and the production is interrupted when the order number has reached a predetermined frequency.

3. A method for the production monitoring with the manufacture of tablets in a rotary tabletting machine, with a row of upper and lower punches arranged in punch pairs, which cooperate with matrix bores, comprising the steps of:

measuring a maximum pressing force value for each punch pair of a predetermined number of punch pairs;

eliminating measured maximum pressing force values which deviate more than a predetermined amount with respect to the other readings;

computing an actual mean value from the remaining measured maximum pressing force values;

comparing the computed actual mean value to a nominal mean value;

changing the supply of material to the individual matrix bores when the deviation exceeds a predetermined measure.

4. A method according to claim 3, further including the steps of storing an order number identifying the punch pair whose reading is eliminated and interrupting the production when the order number has been stored at a predetermined frequency.

5. The method according to claim 3, wherein the predetermined amount used to eliminate measured maximum pressing force values is a value determined so that 95% of all punch pair maximum pressing force value readings lie in a middle region.

* * * * *